United States Patent
Baccelli et al.

(10) Patent No.: US 7,710,881 B2
(45) Date of Patent: May 4, 2010

(54) APPARATUS FOR SCALABLE RELIABLE GROUP COMMUNICATION

(75) Inventors: Francois Baccelli, Meudon (FR); Augustin Chaintreau, Paris (FR); Zhen Liu, Tarrytown, NY (US); Anton Riabov, New York, NY (US); Sambit Sahu, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1532 days.

(21) Appl. No.: 10/721,399

(22) Filed: Nov. 25, 2003

(65) Prior Publication Data
US 2005/0111387 A1 May 26, 2005

(51) Int. Cl.
*H04L 12/16* (2006.01)

(52) U.S. Cl. ........................ 370/238; 370/256

(58) Field of Classification Search .......... 370/390, 370/400, 392, 432, 238, 239, 468, 395; 455/423, 455/403; 709/223
See application file for complete search history.

(56) References Cited

U.S. PATENT DOCUMENTS

| | | | | |
|---|---|---|---|---|
| 6,327,252 B1 * | 12/2001 | Silton et al. | ............. | 370/256 |
| 6,363,319 B1 * | 3/2002 | Hsu | ............. | 701/202 |
| 7,035,937 B2 * | 4/2006 | Haas et al. | ............. | 709/239 |
| 7,075,892 B2 * | 7/2006 | Grover et al. | ............. | 370/238 |
| 7,185,077 B1 * | 2/2007 | O'Toole et al. | ............. | 709/223 |
| 2002/0187770 A1 * | 12/2002 | Grover et al. | ............. | 455/403 |
| 2003/0088696 A1 * | 5/2003 | McCanne | ............. | 709/238 |
| 2003/0147386 A1 * | 8/2003 | Zhang et al. | ............. | 370/390 |
| 2004/0023651 A1 * | 2/2004 | Gollnick et al. | ............. | 455/423 |
| 2005/0054807 A1 * | 3/2005 | Winterowd | ............. | 528/129 |
| 2005/0068954 A1 * | 3/2005 | Liu et al. | ............. | 370/390 |
| 2005/0080894 A1 * | 4/2005 | Apostolopoulos et al. | ... | 709/224 |
| 2005/0086399 A1 * | 4/2005 | Mahany et al. | ............. | 710/18 |
| 2005/0086469 A1 * | 4/2005 | Dunagan et al. | ............. | 713/163 |
| 2005/0114472 A1 * | 5/2005 | Tan | ............. | 709/220 |

OTHER PUBLICATIONS

Yang Chu et al. "Enabling conferencing applications on the Internet using an overlay multicast archtecture", year of publication 2001, ACM Press, New York, NY USA, vol. 31, Issue 4 (Oct. 2001), pp. 55-67.*

Yang-hua Chu et al., *Enabling Conferencing Applications on the Internet using an Overlay Multicast Architecture*, SIGCOMM '01, Aug. 27-31, 2001, San Diego, California.

* cited by examiner

*Primary Examiner*—Steven H Nguyen
*Assistant Examiner*—Syed Bokhari

(57) ABSTRACT

A method for group communication over a network of processors comprises determining an overlay spanning tree comprising an origin node and at least one receiving node, and controlling a source communication rate to be less than or equal to a bottleneck rate of the overlay spanning tree.

19 Claims, 5 Drawing Sheets

APPARATUS FOR SCALABLE RELIABLE GROUP COMMUNICATION

BACKGROUND OF THE INVENTION

1. Field of the Invention

The present invention relates to communications networks, and more particularly to a system and method for reliable data delivery to a group of receivers using overlay distribution tree.

2. Discussion of Related Art

Reliable delivery of content to a group of receivers has several applications. IP-multicast based solutions have been advocated to address content delivery to groups. However, due to deployment issues and scalability concerns, IP-multicast has not succeeded in providing large-scale reliable group communication.

An example of an IP-multicast network is shown in FIG. 1. The network includes an origin node 101 and receiving nodes, e.g., 102 connected through TCP servers, e.g., 103. As is illustrated, each communication comprises multiple connections between, for example, the origin node and a server, and between the server and the receiving node.

While IP-multicast has been examined and matured into a communication mechanism for group-based communication, because of deployment and scalability issues, it is not an attractive solution. More particularly, IP-multicast is not widely deployed in the Internet in spite of extensive research as well as industrial efforts. Further, the throughput of TCP-based reliable communication decreases as the inverse of log of number of participants if IP-multicast is used. Thus, IP-multicast is difficult to scale.

Therefore, a need exists for a system and method for a scalable overlay distribution tree.

SUMMARY OF THE INVENTION

According to an embodiment of the present invention, a method for group communication over a network of processors comprises determining an overlay spanning tree comprising an origin node and at least one receiving node, and controlling a source communication rate to be less than or equal to a bottleneck rate of the overlay spanning tree.

The method comprises protecting data delivery by link error recovery. The overlay spanning tree comprises a plurality of nodes, wherein the data delivery is reliable such that each node receives the same data.

The method comprises scaling the overlay spanning tree to an arbitrary group size.

The method further comprises determining a maximum throughput of the spanning tree among all possible configurations of the spanning tree given a reduced overlay distribution tree. Determining the overlay spanning tree comprises defining a target bandwidth for the overlay tree given a fully connected overlay distribution graph, constructing a reduced overlay distribution graph by removing an edge from the fully connected overlay distribution graph having a bandwidth less than or equal to the target bandwidth, and constructing an arbitrary spanning tree comprising a root, wherein the root is a source node of a plurality of links in the reduced overlay distribution graph. Determining the overlay spanning tree further comprises performing a triangular improvement to remove a link violating a rate constraint, increasing the target bandwidth upon determining that the overlay spanning tree is constructible, and decreasing the target bandwidth upon determining that the overlay spanning tree is not constructible.

The method comprises joining a new node to the spanning tree. The method further comprises joining the new node to an existing node of the spanning tree upon determining that the existing node has a bandwidth of greater than or equal to an existing rate. The method comprises determining a triangular improvement upon determining that no existing node has a bandwidth greater than or equal to the existing rate, joining the new node at an attachment point having a highest bandwidth among existing nodes of the spanning tree upon determining that the triangular improvement failed, and redetermining the spanning tree upon determining bandwidth less than or equal to a minimum threshold.

The method comprises redetermining the spanning tree upon determining that an existing node has left the spanning tree. The method comprises determining orphaned child nodes of the existing node that has left the spanning tree, and performing a join for each orphaned child node.

According to an embodiment of the present invention, a program storage device is provided readable by machine, tangibly embodying a program of instructions executable by the machine to perform method steps for group communication over a network of processors. The method comprising determining an overlay spanning tree comprising an origin node and at least one receiving node, and controlling a source communication rate to be less than or equal to a bottleneck rate of the overlay spanning tree.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Reliable delivery of content to a group of receivers has several applications. For example, collaborative applications delivering content to a set of populations without consuming undesirable quantities of network resources and without disrupting other existing forms of communications.

The present invention is both scalable and efficient in supporting reliable content delivery to a set of populations. An overlay distribution tree is built where receivers are the nodes in the tree. Using rate control at an origin node and buffer management at the application layer at each node, TCP congestion control is used locally at each node to reliably transfer the content.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
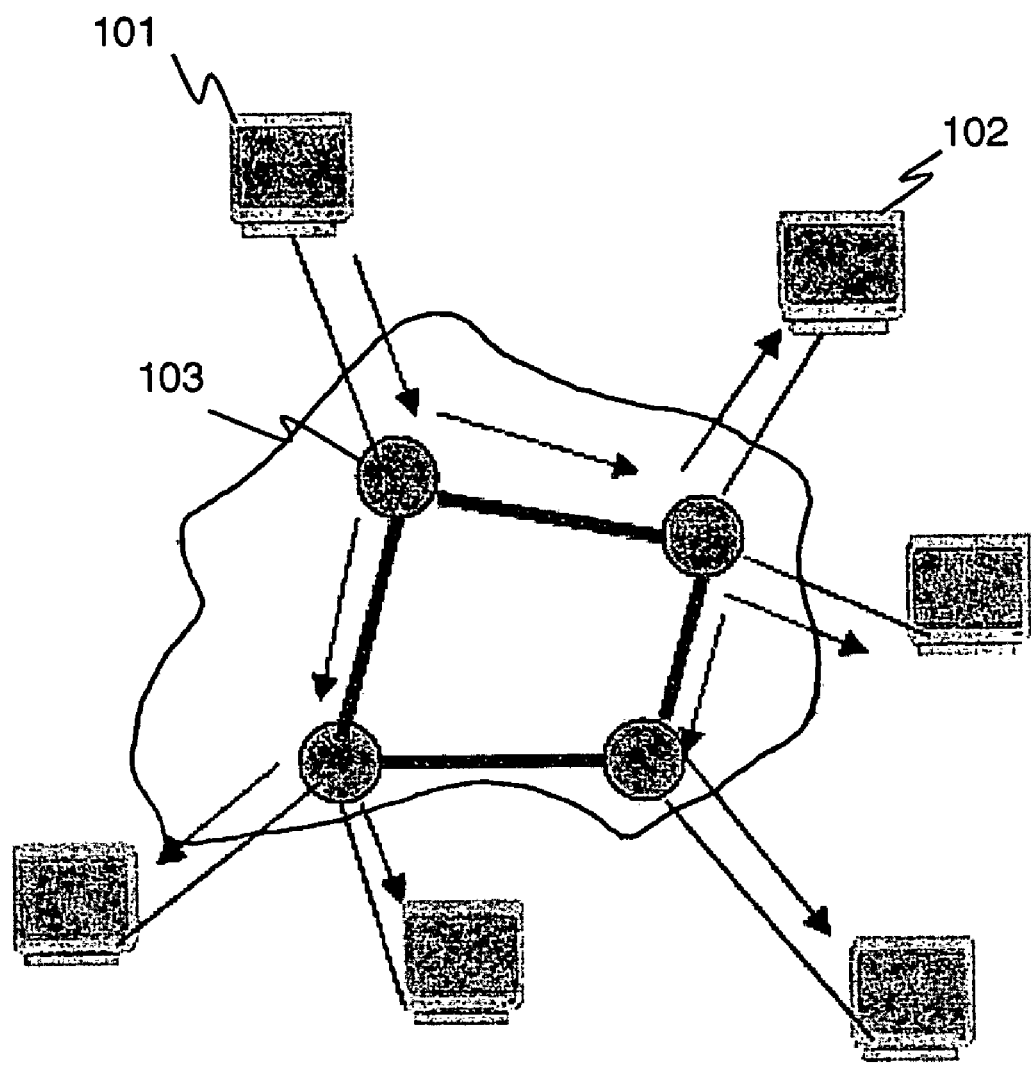
FIG. 1 is a diagram of an IP-multicast communications group.
Figure 2:
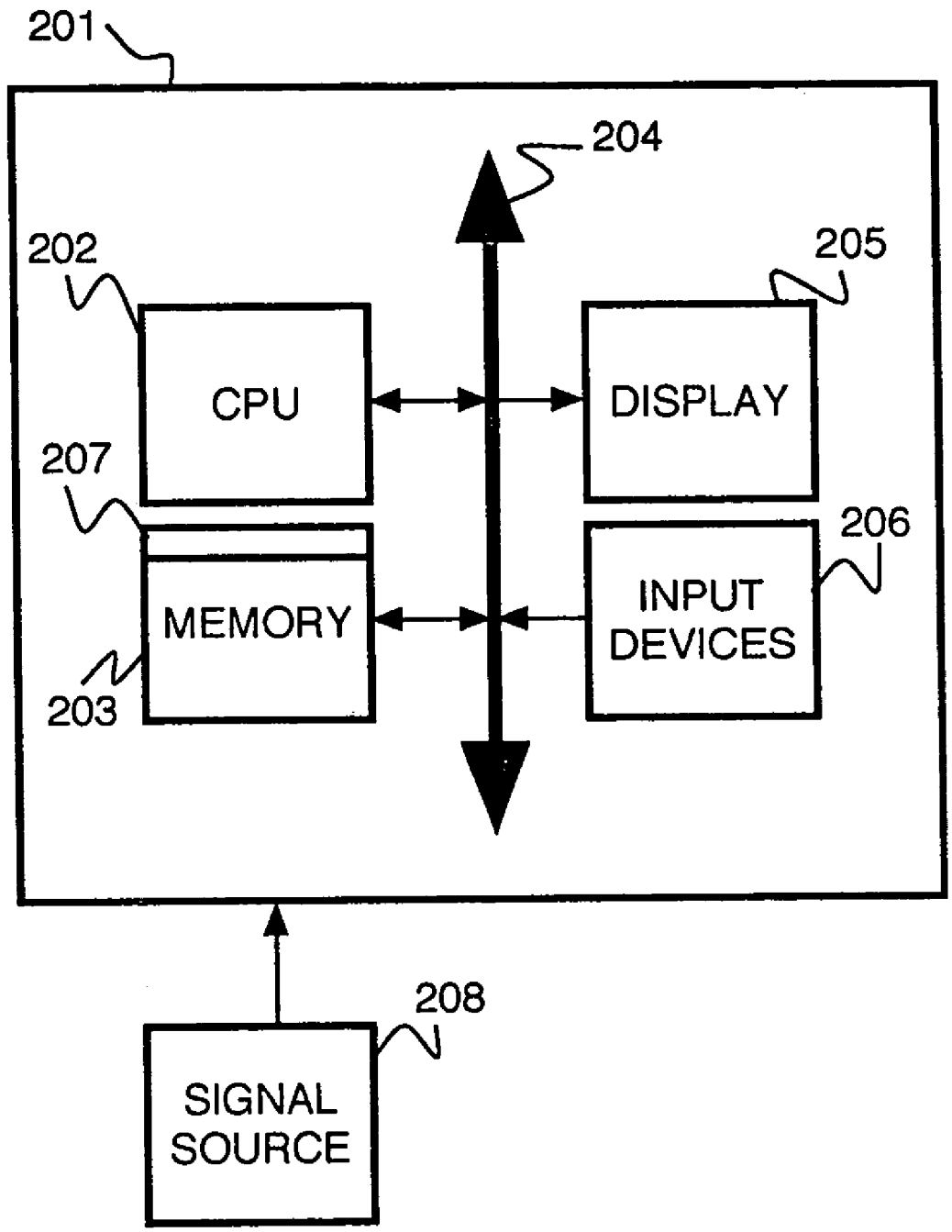
FIG. 2 is a diagram of a system according to an embodiment of the present invention.

Referring to FIG. 2, according to an embodiment of the present invention, a computer system 201 for implementing the present invention can comprise, inter alia, a central processing unit (CPU) 202, a memory 203, and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general-purpose computer system that becomes a specific purpose computer system when executing the routine 207 of the present invention.

The computer platform 201 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, the TCP stack and buffering at the application layer are used to support reliable group communication on an overlay distribution tree. No special support is needed from the routers—the overlay distribution tree can be deployed in the Internet with the existing protocols in the routers. The overlay distribution tree can be implemented for any group size, the method is scalable.

Figure 3:
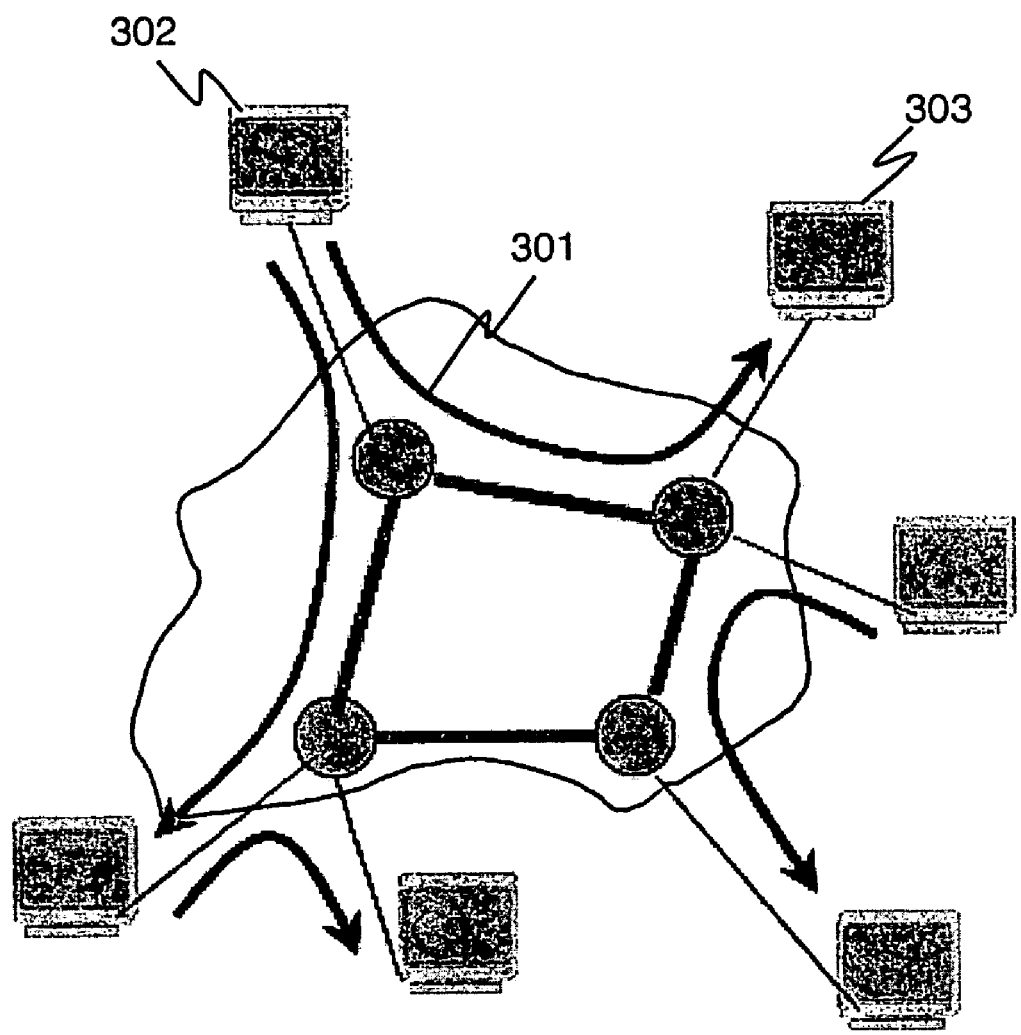
FIG. 3 is a diagram of a communications group according to an embodiment of the present invention.

Referring to FIG. 3, a congestion control protocol of TCP is implemented in a hop-by-hop manner by using the overlay distribution tree to forward contents. A hop denotes the connection path 301 between any two participants, e.g., an origin node 302 and a receiving node 303. Thus, if an origin node throttles the sending rate at or below a bottleneck link bandwidth in the overlay tree, it can scale to any arbitrary group size. That is, by preventing bottlenecks through rate control, network reliability is maintained for different scales.

Different methods can be used to generate the overlay distribution tree. For example, according to an embodiment of the present invention, the distribution tree achieves a high throughput when TCP congestion control is used between any link for reliably transferring data to a set of participants.

Figure 4:
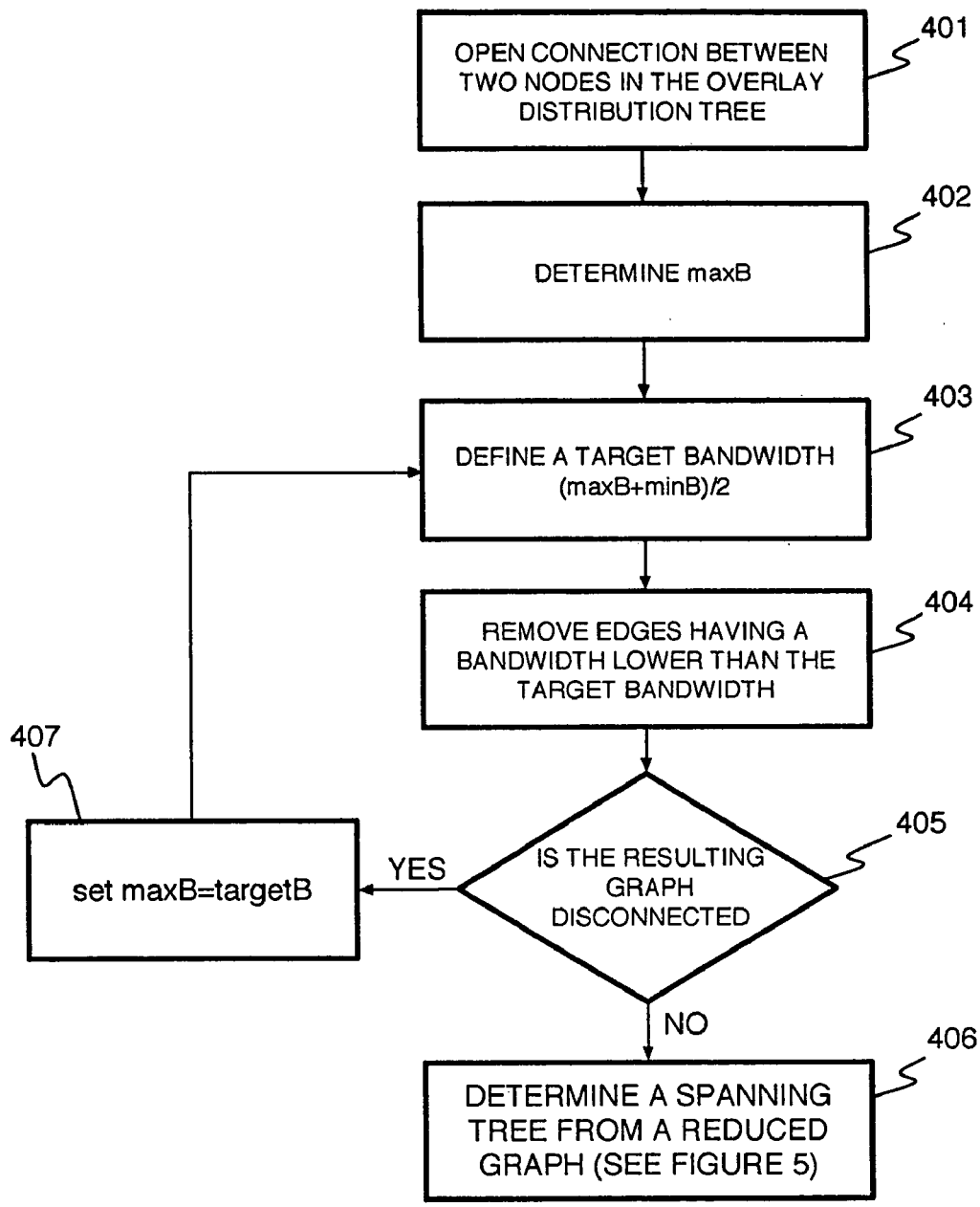
FIG. 4 is a flow chart of a method according to an embodiment of the present invention.
Figure 5:
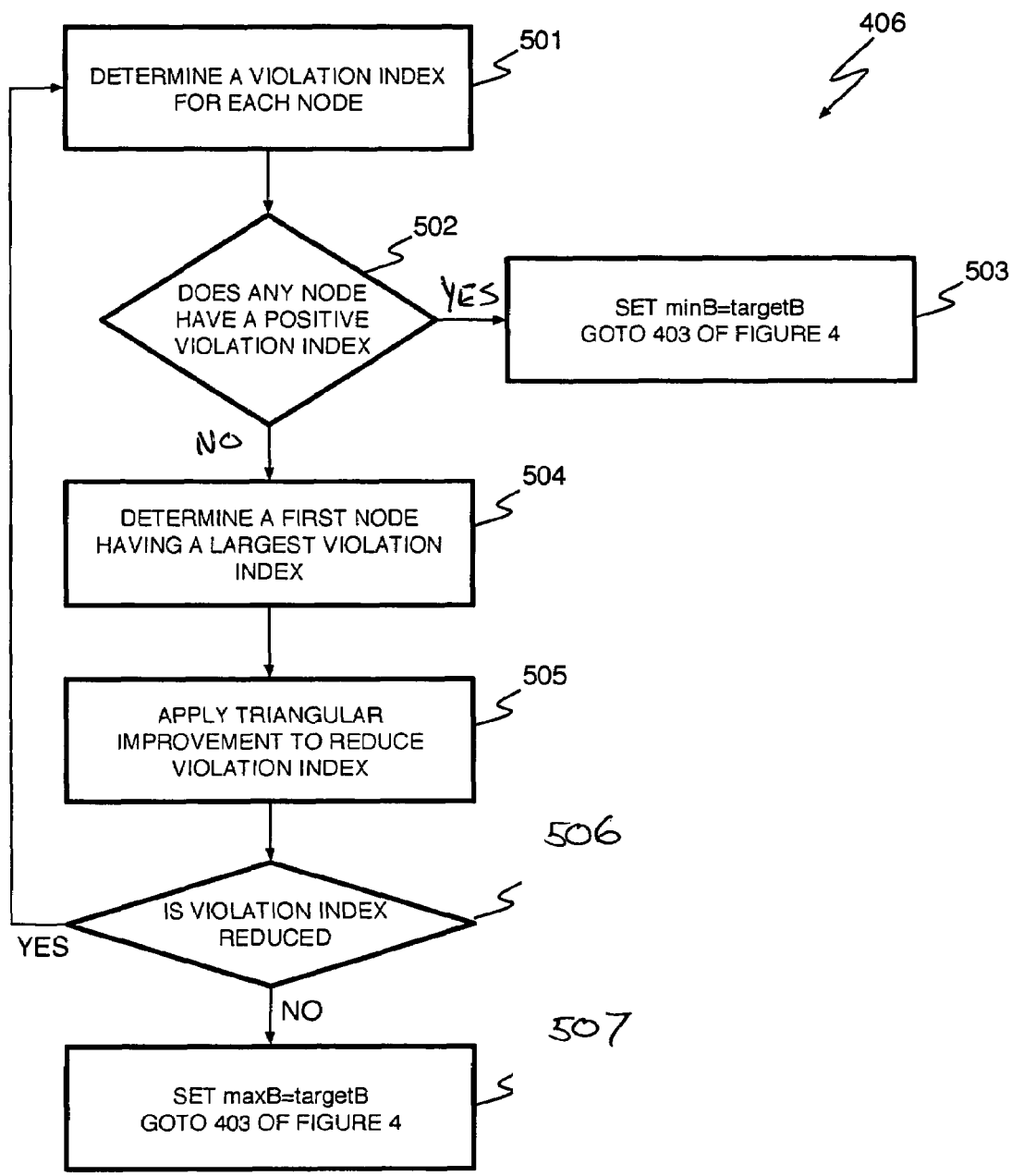
FIG. 5 is a flow chart of a method according to an embodiment of the resent invention.

Referring to FIG. 4, assuming that each node has knowledge about its access link bandwidth, and that the end-to-end TCP bandwidth is known between any two nodes, a TCP connection is opened between two nodes 401. Let this be denoted as tcp (i,j) between any two nodes i and j. Let a(i) be the access link bandwidth from a node i.

Starting with a fully connected graph, the maxB is determined 402. The maxB is the maximum link bandwidth where link bandwidth on edge (i,j) is given by min $\{a(i), a(j), tcp(i,j)\}$.

Note that the optimal group bandwidth will be between 0 and maxB. Thus, minB=0;

maxB=maximum link bandwidth;

A target bandwidth is defined as 403:

target$B$=(min$B$+max$B$)/2 where the result can be rounded, preferably down.

The edges that have less link bandwidth than targetB are removed 404. Here link bandwidth is given by min$\{a(i)/f(i), tcp(i,j), a(j)/f(j)\}$ where f(i) is the outgoing edges from node i. It is determined whether the resulting graph is a disconnected graph 405. If the graph is disconnected, set maxB=targetB 407.

A spanning tree is determined from the reduced graph 406 upon determining that the graph is not disconnected. The spanning tree is constructed having a desirable throughput, e.g., a spanning tree having a maximum throughput among all possible configurations of the spanning tree. A violation index V(i) is determined for each node i which is defined as target B/a(i)*f(i) 501. If it is determined that a node has a positive violation index 502, set minB=targetB 503. Upon determining that the node has a positive violation index, the target bandwidth is redefined 503. Upon determining that no node has a positive violation index, the node in the spanning tree that has the largest violation index is determined 504. A triangular improvement is applied to reduce the violation index of the node 505. If the violation index of the node is determined to not have been reduced set maxB=targetB 506, the target bandwidth is redefined 507. Upon determining that the violation index of the node has been reduced 506, the violation index of a next node is determined 501.

The two nodes that have the next largest violation index are determined, such that there exists edges to these two nodes from this largest violating node. The existing link is replaced and the links that have the next largest violation link are added. A depth first algorithm could be used to find the existence of such two nodes. This process is triangular improvement—in which the violation index of the node under consideration is reduced by one.

The spanning tree is reduced until a condition is reached wherein all nodes are non-violating. If such a tree does not exist, set maxB=targetB, and go to block 403.

Once the spanning tree has been reduced to where all nodes are non-violating, set minB=targetB, and go to block 403.

The binary search on minB and maxB determines the overlay that results in the maximum group throughput. Let the maximum rate for which there is a non-violating spanning tree be denoted as rateB.

The sending rate of origin node is set to rateB. Use the resulting overlay tree to send data using the hop-by-hop TCP congestion control.

According to an embodiment of the present invention, a method for constructing a scalable spanning tree to group communication is within ½ of an optimal solution and shown to scale to any arbitrary group size. Note that the above constructed overlay handles a given set of nodes. The proposed solution can be adapted to handle leave and joining of nodes in the communication tree.

Join/leave operations can be performed according a desired protocol. For example, if the new participating node has a link to a node in the existing overlay with sufficient bandwidth, the new node is attached to that available node. If not, the new node is attached to any arbitrary link and the method described with respect to FIG. 4 is applied. For nodes leaving the overlay distribution tree, e.g., the communications group, these nodes are treated as a set of nodes joining. Consider that node i is leaving from the overlay. Let the children of node i be denoted as Child(i). A new join procedure is followed for each node j in the set Child(i). Methods for handling join/leave can be improved to have substantially similar performance as a solution for the static case, e.g., no join/leave.

Having described embodiments for a system and method for reliable content delivery to a set of receivers, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for group communication over a network of processors comprising: a computer system to implement the steps of: determining an overlay spanning tree comprising an origin node and at least one receiving node; determining a configuration of the overlay spanning tree having a maximum throughput among all possible configurations of the overlay spanning tree, wherein determining the configuration of the overlay spanning tree comprises defining a target bandwidth having a value equal to half a sum of a minimum link bandwidth and a maximum link bandwidth of edges of the overlay spanning tree given a fully connected overlay distribution graph, constructing a reduced overlay distribution graph having a minimum available bandwidth greater than the target bandwidth by iteratively removing an edge from a current overlay distribution graph, beginning with the fully connected overlay distribution graph, the edge having a bandwidth less than or equal to the target bandwidth, increasing the target bandwidth upon determining that the configuration of the overlay spanning tree is constructible based on the current overlay distribution graph, and decreasing the target bandwidth upon determining that the configuration of the overlay spanning tree is not constructible based on the current overlay distribution graph, until the configuration of the overlay spanning tree has the maximum throughput with no edge having a bandwidth below the target bandwidth; and controlling a source communication rate between the origin node and the at least one receiving node to be less than or equal to a bottleneck rate of the configuration of the overlay spanning tree based on the reduced overlay distribution graph.

2. The computer-implemented method of claim 1, further comprising protecting data delivery by link error recovery.

3. The computer-implemented method of claim 2, wherein the overlay spanning tree comprises a plurality of nodes, wherein the data delivery is reliable such that each node receives the same data.

4. The computer-implemented method of claim 1, further comprising scaling the overlay spanning tree to an arbitrary group size.

5. The computer-implemented method of claim 1, further comprising joining a new node to the spanning tree.

6. The computer-implemented method of claim 5, comprising joining the new node to an existing node of the spanning tree upon determining that the existing node has a bandwidth of greater than or equal to an existing rate.

7. The computer-implemented method of claim 6, further comprising:
determining a triangular improvement upon determining that no existing node has a bandwidth greater than or equal to the existing rate;
joining the new node at an attachment point having a highest bandwidth among existing nodes of the spanning tree upon determining that the triangular improvement failed; and redetermining the spanning tree upon determining bandwidth less than or equal to a minimum threshold.

8. The computer-implemented method of claim 1, further comprising redetermining the spanning tree upon determining that an existing node has left the spanning tree.

9. The computer-implemented method of claim 8, further comprising:
determining orphaned child nodes of the existing node that has left the spanning tree; and
performing a join for each orphaned child node.

10. The computer-implemented method of claim 1, wherein the removed edge is not replaced in the current overlay distribution graph.

11. A program storage device embodying a program of instructions executed by a processor to perform method steps for group communication over a network of processors, the method steps comprising: determining an overlay spanning tree comprising an origin node and at least one receiving node; determining a configuration of the overlay spanning tree having a maximum throughput among all possible configurations of the overlay spanning tree, wherein determining the configuration of the overlay spanning tree comprises defining a target bandwidth having a value equal to half a sum of a minimum link bandwidth and a maximum link bandwidth of edges of the overlay spanning tree given a fully connected overlay distribution graph, constructing a reduced overlay distribution graph having a minimum available bandwidth greater than the target bandwidth by iteratively removing an edge from a current overlay distribution graph, beginning with the fully connected overlay distribution graph, the edge having a bandwidth less than or equal to the target bandwidth, increasing the target bandwidth upon determining that the configuration of the overlay spanning tree is constructible based on the current overlay distribution graph, and decreasing the target bandwidth upon determining that the configuration of the overlay spanning tree is not constructible based on the current overlay distribution graph, until the configuration of the overlay spanning tree has the maximum throughput with no edge having a bandwidth below the target bandwidth; and-controlling a source communication rate between the origin node and the at least one receiving node to be less than or equal to a bottleneck rate of the configuration of the overlay spanning tree based on the reduced overlay distribution graph.

12. The program storage device of claim 11, further comprising protecting data delivery by link error recovery.

13. The program storage device of claim 12, wherein the overlay spanning tree comprises a plurality of nodes, wherein the data delivery is reliable such that each node receives the same data.

14. The program storage device of claim 11, further comprising scaling the overlay spanning tree to an arbitrary group size.

15. The program storage device of claim 11, further comprising joining a new node to the spanning tree.

16. The program storage device of claim 15, comprising joining the new node to an existing node of the spanning tree upon determining that the existing node has a bandwidth of greater than or equal to an existing rate.

17. The program storage device of claim 16, further comprising: determining a triangular improvement upon determining that no existing node has a bandwidth greater than or equal to the existing rate; joining the new node at an attachment point having a highest bandwidth among existing nodes of the spanning tree upon determining that the triangular improvement failed; and redetermining the spanning tree upon determining bandwidth less than or equal to a minimum threshold.

18. The program storage device of claim 11, further comprising redetermining the spanning tree upon determining that an existing node has left the spanning tree.

19. The program storage device of claim 18, further comprising: determining orphaned child nodes of the existing node that has left the spanning tree; and performing a join for each orphaned child node.

* * * * *